United States Patent Office 3,036,049
Patented May 22, 1962

3,036,049
LIGHT-COLORED ELASTOMER AND METHOD
OF MAKING THE SAME
William E. Leuchten, Hamilton Square, and Albert Franklin Vondy, Bordentown, N.J., assignors to Thiokol Chemical Corporation, Bristol, Pa.
No Drawing. Filed Jan. 28, 1959, Ser. No. 789,520
5 Claims. (Cl. 260—79.1)

This invention relates to the manufacture of rubber-like polysulfide polymers and more particularly to a method of curing polysulfide polymers to produce a white or pastel-colored elastomeric product, as well as to the product thus produced.

Polysulfide rubbers have long been known and methods of making them are disclosed in, for example, U.S. Patents 1,890,191; 2,206,641; 2,206,642; 2,206,643; 2,216,044; 2,221,650; 2,235,621; 2,255,228; 2,278,127 and 2,278,128. In general such synthetic rubbers are prepared by reacting polyfunctional organic compounds with alkali metal or alkaline earth metal sulfide solutions to produce high molecular weight polymers having the recurring unit (RSS), wherein R is usually a divalent organic radical that may vary widely in its specific structure as disclosed in the patents referred to above, and SS represents a disulfide linkage through which the organic radicals are interconnected. In order to improve the properties of the polymers it is customary to use a mixture of difunctional and trifunctional organic compounds wherein the trifunctional compound is present in a relatively small amount to produce a slightly cross-linked structure.

Although the organic radicals represented by the symbol R above may vary considerably in their specific structure, the commercially important polymers are usually made from certain aliphatic halides, e.g. alkylene chlorides such as ethylene dichloride and its homologues or oxygen-containing aliphatic dichlorides such as bis-beta-chloroethyl formal. Thus most of the commercial polymers are primarily composed of relatively short chain divalent alkylene and/or oxahydrocarbon radicals interconnected by disulfide groups.

The present invention is particularly concerned with liquid polysulfide polymers which can be obtained from the high molecular weight polymers referred to above by a splitting process described in U.S. Patent 2,466,963. As disclosed in the latter patent, the high molecular weight polymers can be split to form polythiopolymercaptan polymers having molecular weights of the order of 500 to 25,000 and which are viscous liquids having viscosities within the range 300 to 100,000 centipoises. Such liquid polymers can be cured by any of various curing agents as disclosed in Patent 2,466,963 to form solid elastomers having excellent resistance to acids, alkalis, petroleum hydrocarbons and atmospheric oxidation. Such liquid polymers have been extensively used in the production of rubbery coatings on a variety of surfaces and have been found especially useful in providing rubbery films having good adhesion to metal surfaces. Thus the cured compositions have been used as sealants for sealing panes of glass to metal window frames and as lining materials for integral fuel tanks of aircraft.

While a very wide variety of such liquid polymers can be prepared as indicated by the disclosures of the patents referred to above, the polymers that are presently of commercial importance fall within a somewhat more limited group. The commercially important liquid polymers are particularly described in articles by Fettes and Jorczak published in "Industrial and Engineering Chemistry," vol. 42, page 2217 (1950) and vol. 43, page 324 (1951). As pointed out in these published articles the commercially available liquid polymers are generally prepared from bis-beta-chloroethyl formal and are essentially composed of recurring $(S.CH_2.CH_2.O.CH_2.O.CH_2CH_2.S)$ groups and have free mercapto terminals through which they may be cured to form a solid elastomer. In the manufacture of these commercial polymers a small percentage of trichloropropane is commonly mixed with the bis-beta-chloroethyl formal to provide a cross-linking as described above.

As indicated above, such liquid polymers when mixed with a curing agent such as, for example, lead peroxide, can be applied to a metal surface and cured at room temperature or at an elevated temperature to form a strongly adherent rubber coating on the metal. However, it has not heretofore been possible to produce a satisfactory coating of this type which is either white or pastel-colored. When the previously proposed curing agents and curing procedures are used, a discolored coating or one that is not sufficiently adherent to the metal surface is obtained. In certain of the sealant applications wherein these materials are used it is highly desirable that the cured coating be white or colored some light pastel color. It has not previously been possible to achieve this result.

It is accordingly an object of the present invention to provide a method of curing a liquid polysulfide polymer of the type referred to above to produce a white or pastel-colored elastomer. It is another object of the invention to produce a white or pastel colored elastomeric polysulfide polymer in the form of coating or otherwise. Other objects of the invention will be in part obvious and in part pointed out hereafter.

The objects of the invention are achieved in general by using antimony trioxide as a curing agent for a liquid polysulfide polymer of the type described above. It has been found that when antimony trioxide is used for curing such polymers, a very light colored elastomer is obtained that is strongly adherent to metal surfaces. This result is quite surprising since antimony pentoxide which contains a higher proportion of oxygen than the trioxide does not give a satisfactory cure.

The antimony trioxide used may be either the pure compound or any of various commercial products which contain small amounts of impurities such as zinc oxide and tin oxide. The presence of such minor amounts of impurities does not appear to interfere with the curing of the polymer to achieve the desired light-colored product.

In order to achieve a practical cure rate, it is necessary that the particle size be sufficiently small. Commercially available $Sb_2O_3$ may be satisfactory but it is generally desirable to ball mill the material for 24 hours before using. Excess ball milling or ball milling an already satisfactory lot is harmless.

In general the curing procedure employed is similar to that previously used for curing liquid polysulfide polymers with curing agents such as lead peroxide. In addition to the curing agent various ancillary materials such as fillers, pigments and reinforcing agents, e.g. barium sulfate, calcium carbonate, silicon dioxide, titanium oxide, bentonite and magnesium silicate may be incorporated in the mixture to be cured. Also in effecting the present antimony trioxide cure it has been found desirable to incorporate a buffer such as sodium stearate, lithium stearate, potassium stearate or calcium stearate to improve the heat aging stability of the compound. Sodium stearate is the preferred buffer.

In order to point out more fully the nature of the present invention the following specific examples are given.

EXAMPLE 1

The polysulfide polymer used in this example is a liquid polymer having a molecular weight of about 4000. It may be prepared by following the procedure of Example XII of Patent 2,466,963.

To 100 parts of this polymer dispersed on a paint mill there were added in sequence 35 parts by weight of titanium oxide pigment (Titanox AMO), 10 parts by weight of finely divided silica (Cab-O-Sil), 15 parts by weight of substantialy pure antimony trioxide ($Sb_2O_3$) and 5 parts of sodium stearate as a buffer. Mixing was continued for one-half hour to insure thorough dispersion of the solid materials of the liquid polymer. The mixture was allowed to stand for six hours to effect a partial cure and then pressed out into test sheets 0.075 to 0.080 inches thick.

The test sheets were cured for an additional period of 16 hours at room temperature, at the end of which time curing of the polymer to an elastomer appeared to be complete. The average tensile strength of the test sheets was 370 p.s.i. and their maximum elongation was 550%. The test pieces exhibited a hardness of 43 on the Shore A scale.

Some of the test pieces were heat-aged for one week at 158° F. and others were heat-aged for one week at 212° F. The physical properties at the end of this heat-aging period are given in Table 1 below.

*Table 1*

| Property | One Week at 158° F. | One Week at 212° F. |
|---|---|---|
| Tensile, p.s.i. | 730 | 935 |
| Elongation, percent | 500 | 930 |
| Hardness, Shore A | 63 | 59 |

EXAMPLE 2

The procedure of Example 1 was followed except that the curing agent used was an antimony trioxide containing about 5% by weight of zinc oxide. The physical properties of test pieces prepared with this curing agent were determined before and after heat-aging and the results are given in Table 2 below.

*Table 2*

| Property | Original Value | Aged One Week at 158° F. | Aged One Week at 212° F. |
|---|---|---|---|
| Tensile, p.s.i. | 265 | 580 | 770 |
| Elongation, percent | 580 | 440 | 950 |
| Hardness, Shore A | 43 | 63 | 58 |

EXAMPLE 3

The procedure of Example 1 was followed except that the antimony oxide used was antimony trioxide containing about 5% by weight of tin oxide (SnO). Test pieces prepared with this curing agent were tested both before and after heat-aging and the results are given in Table 3 below:

*Table 3*

| Property | Original Value | Aged One Week at 158° F. | Aged One Week at 212° F. |
|---|---|---|---|
| Tensile, p.s.i. | 270 | 535 | 800 |
| Elongation, percent | 530 | 410 | 930 |
| Hardness, Shore A | 43 | 63 | 60 |

EXAMPLE 4

The polymer used in this example had a molecular weight similar to that of the polymer of Example 1, but differed from the Example 1 polymer in that it had 2% of cross-linking rather than 0.5% of cross-linking. The polymer of this example is sold under the commercial designation LP-2.

This polymer can be used with advantage in the making of dental impressions. However, the usual lead peroxide cure is objectionable in this application because of the relatively dark brown color of the resulting elastomer. By employing the following formulation containing antimony trioxide as a curing agent a light-colored and therefore more acceptable molded product can be achieved.

| | Parts by weight |
|---|---|
| Liquid polymer | 100 |
| Titanox AMO | 50 |
| $Sb_2O_3$ | 40 |
| $ZnO_2$ | 10 |
| PbO | 10 |

This composition sets in 5 minutes and cures in 8 minutes to give a pale yellow rubbery material.

EXAMPLE 5

Pastel shades may be obtained by using small amounts of paste pigments of the desired color. The use of such pigments is illustrated by the formulations of Table 4 wherein the polymer is the same as that of Example 1 and the quantities are given in parts by weight.

*Table 4*

| | | | |
|---|---|---|---|
| Liquid Polymer | 100 | 100 | 100 |
| Titanox AMO | 35 | 35 | 35 |
| Cab-O-Sil | 10 | 10 | 10 |
| Sodium Stearate | 5 | 5 | 5 |
| $Sb_2O_3$ | 15 | 15 | 15 |
| Claremont Paste: | | | |
| 4050-CSL-1 (Pink) | 0.4 | | |
| 4040-UB-2 (Blue) | | 0.4 | |
| 4060-HCG-1 (Green) | | | 0.4 |
| Color of Cured Product | Pink | Blue | Green |

The materials listed above in the indicated quantities are mixed on a paint mill as described in Example 1. On standing, the compositions cure to a rubbery material having the indicated color.

It should be apparent from the foregoing description and examples that the present invention provides a method of achieving the objects set forth in the introduction of the present specification. It is of course to be understood that the foregoing examples are illustrative only and that numerous changes can be made in the ingredients, proportions and conditions set forth without departing from the spirit of the invention as defined in the appended claims.

We claim:

1. Method of making a light-colored synthetic rubber which comprises mixing a liquid polythiopolymercaptan polymer having a molecular weight of 500 to 25,000 with a curing agent which is antimony trioxide to cause said curing agent to cure said polymer to a solid light-colored elastomer, and causing said curing agent to cure said polymer to said elastomer.

2. Method of making a light-colored synthetic rubber which comprises mixing a liquid polythiopolymercaptan polymer having a molecular weight of 500 to 25,000 and essentially composed of aliphatic oxahydrocarbon radicals interconnected by polysulfide groups with a curing agent which is antimony trioxide to cause said curing agent to cure said liquid polymer to a solid elastomer, and causing said curing agent to cure said polymer to said elastomer.

3. A light-colored elastomer made by the method of claim 1.

4. A light-colored elastomer made by the method of claim 2.

5. The method of making a pastel-colored synthetic rubber which comprises mixing a liquid polythiopolymercaptan polymer having a molecular weight of 500 to 25,000 with antimony trioxide as a curing agent and a pigment paste to cause said curing agent to cure said polymer to a colored elastomer, and causing said curing agent to cure said polymer to said elastomer.

References Cited in the file of this patent

UNITED STATES PATENTS 2,466,963     Patrick ---------------- Apr. 12, 1949

OTHER REFERENCES

Parkington: "A Textbook of Inorganic Chemistry," MacMillan (1953).

Fettes et al.: Ind. and Eng. Chem., vol. 42, No. 11, pp. 2217–20 (1950).

Jorczak et al.: Ind. and Eng. Chem., vol 43, pp. 324–27 (1951).

Scheele et al.: Kautschuk u. Gummi, 9, Wt 110–13 (1956), see C.A. 11049(d), vol. 50 1956.